(12) United States Patent
Dickson

(10) Patent No.: US 7,646,374 B2
(45) Date of Patent: Jan. 12, 2010

(54) EXERCISE KEYBOARD

(76) Inventor: Noris John Dickson, Box 144, Ashcroft, British Columbia (CA) V0K 1A0

( * ) Notice: Subject to any disclaimer, the term of this patent is extended or adjusted under 35 U.S.C. 154(b) by 391 days.

(21) Appl. No.: 11/638,451

(22) Filed: Dec. 14, 2006

(65) Prior Publication Data

US 2007/0183829 A1      Aug. 9, 2007

Related U.S. Application Data

(60) Provisional application No. 60/771,425, filed on Feb. 9, 2006.

(51) Int. Cl.
*G06F 3/02* (2006.01)
(52) U.S. Cl. .......................... 345/168; 463/36; 463/37
(58) Field of Classification Search .................. 345/168
See application file for complete search history.

(56) References Cited

U.S. PATENT DOCUMENTS

| | | | |
|---|---|---|---|
| 4,534,557 A | | 8/1985 | Bigelow et al. |
| 4,941,660 A | | 7/1990 | Winn et al. |
| 4,953,664 A | * | 9/1990 | Vrooman et al. ............... 186/59 |
| 5,137,384 A | * | 8/1992 | Spencer et al. ............. 400/489 |
| 5,160,919 A | * | 11/1992 | Mohler et al. ................ 345/168 |
| 5,290,115 A | * | 3/1994 | Little ........................ 400/491 |
| 5,450,078 A | | 9/1995 | Silva et al. |
| 5,486,001 A | | 1/1996 | Baker |
| 5,591,104 A | | 1/1997 | Andrus et al. |
| 5,618,180 A | | 4/1997 | Nathanson |
| 5,685,805 A | | 11/1997 | Peritz |
| 5,697,791 A | | 12/1997 | Nashner et al. |
| 5,704,836 A | | 1/1998 | Norton et al. |
| 5,723,786 A | | 3/1998 | Klapman |
| 5,733,193 A | | 3/1998 | Allard et al. |
| 5,803,877 A | | 9/1998 | Franey |
| 5,898,111 A | | 4/1999 | Blankenship et al. |
| 6,093,119 A | | 7/2000 | Tipton |
| 6,094,239 A | | 7/2000 | Weber |
| 6,132,118 A | * | 10/2000 | Grezeszak ................... 400/489 |
| 6,712,737 B1 | | 3/2004 | Nusbaum |

(Continued)

FOREIGN PATENT DOCUMENTS

CA      1268063      4/1990

OTHER PUBLICATIONS http://videogameworkout.com—"Videogame Workout Lose Weight and Get in Shape by Playing Video Games", Glen Raphael, San Francisco, CA, USA—Jan. 4, 2006.

(Continued)

*Primary Examiner*—Kee M Tung
*Assistant Examiner*—Jwalant Amin
(74) *Attorney, Agent, or Firm*—Antony C. Edwards

(57) ABSTRACT

An exercise keyboard including a substantially vertical keyboard array of keypads arranged for typing alphanumeric letters by pushing of keypads of the array so as to type one the letter per the push of one of the keypads. Each keypad is padded so as to accommodate the pushing of the keypads by striking or kicking of the keypads by a user. The array is mounted in, and advantageously to, a supporting frame and sized for the striking or kicking of the key pads by a user while standing. The keyboard is adapted for communication with a computer.

19 Claims, 11 Drawing Sheets

U.S. PATENT DOCUMENTS

| | | | |
|---|---|---|---|
| 6,822,854 B2 * | 11/2004 | Te Maarssen et al. | 361/679.19 |
| 6,852,069 B2 | 2/2005 | Park | |
| 6,925,851 B2 | 8/2005 | Reinbold et al. | |
| 7,088,339 B2 * | 8/2006 | Gresham | 345/168 |
| 7,396,987 B1 * | 7/2008 | Tentindo | 84/423 R |
| 2002/0061498 A1 | 5/2002 | Nagarajan et al. | |
| 2004/0063481 A1 | 4/2004 | Wang | |
| 2004/0171460 A1 | 9/2004 | Park | |
| 2004/0214144 A9 | 10/2004 | Marcus et al. | |
| 2004/0242384 A1 | 12/2004 | Widerman et al. | |
| 2005/0134571 A1 * | 6/2005 | Richardson et al. | 345/169 |
| 2006/0207480 A1 * | 9/2006 | Knight | 108/50.01 |

OTHER PUBLICATIONS http://www.electroniczone.co.uk/15863.html?*session*id*key*=*session*id*val*—Electronic Zone—"Actionstick"—p. 11&12—Dec. 13, 2006.

http://www.ddrgame.com/dance-dance-revolution-fighting-arena-m03891.html=Comabt Zone, for Playstation2—Interaction Action Arena—Dec. 13, 2006.

* cited by examiner

EXERCISE KEYBOARD

CROSS REFERENCE TO RELATED APPLICATION

This application claims priority from U.S. Provisional Patent Application No. 60/771,425 filed Feb. 9, 2006 entitled Exercise Keyboard.

FIELD OF THE INVENTION

This invention relates to computer keyboards and in particular to an oversize computer keyboard having striking pads for keys wherein the keyboard stands vertically so that the keys may be struck by a user with punching and kicking blows as a form of exercise while keyboarding.

BACKGROUND OF THE INVENTION

A number of prior art systems and devices use a web camera or similar camera technology to track body position and motion of the user for purposes of interactive computer based fitness such as Action Stick from Electronic Zone, Body attached lighting devices tracked by video United States Patent Publication No. 2004/0063481A1, and Motion based command generation technology U.S. Pat. No. 5,704,836. A command system optically monitors the movement of a subject and provides command signals to a computer system to control a graphic of a graphical user interface displayed on a monitor such as an animated character in a video game. The command system has an optical detector unit, which continuously scans a subject frame in which the subject is positioned. The subject frame is divided into sub-regions around the subject in which movement of the subject is detected, for example, an arm moving.

Sony Computer Entertainment has recently introduced a workout video game program branded "Eye Toy: Kinetic™, the revolutionary new way to get a great workout . . . ", that uses a camera attached to the PlayStation 2 to image the user's body position in front of an attached video display. The game tracks the user's motion while presenting targets for the user to virtually hit with their feet and hands, there by causing the user to exercise.

The above prior art examples provide no target resistance to actuation and are not typically configured for standard keyboard input. Another interactive fitness game system uses RF body sensors to track wrist and ankle movement of the user as input primarily for fighting games such as "Combat Zone".

Floor based keyboards have been used as input devices primarily for electronic musical instruments and video games as taught in Canadian Patent No. 1,268,063 entitled "Dancing Musical Instrument". Similar Dancing video game input devices use the weight or force of step or stomp of the user on the floor pad to generate input to the attached musical instrument or video game.

Impact and Force input are used as input to a system for evaluation of force is taught in U.S. Pat. No. 4,534,557 "Reaction Time and Applied Force Feedback", which is used for feedback training system for sports, includes a least one sport training device, a stimulus indicator located near and associated with the sport training device. This prior art is used for measuring force and reaction time as opposed to providing user input means to a computer.

SUMMARY OF THE INVENTION

The present invention allows keyboarding input to a computer while exercising. The user strikes the keyboard keys on an oversize vertical keyboard and in so doing also exercises. The keyboard keys are labeled striking pads for example similar to those used for martial arts training. The pads are supported by horizontal bars mounted on upright stanchions supported by a moveable base on a non-slip mat floor surface. Each striking pad has an integrated switch that activates when the pad is struck with sufficient force. The closure of the switch is detected and encoded by a keyboard interface to the appropriate ASCII keyboard code and conveyed to the computer via a conventional keyboard connection (for example serial, usb, ibm). Variations of interfacing keypad switches may include hard wiring, radio frequency link, and infrared communications link.

A computer display may be mounted above and behind the keyboard for easy viewing while keyboarding. The keyboard may be flexible so that it may be configured in either a planar or arched configuration, such as a convex, concave, or compound arch, depending on user preference.

In summary, the present invention may be characterized in one aspect as an exercise keyboard including a substantially vertical keyboard array of keypads arranged for typing alphanumeric letters by pushing of keypads of the array so as to type one the letter per the push of one of the keypads. Each keypad is padded so as to accommodate the pushing of the keypads by striking or kicking of the keypads by a user. The array is mounted in, and advantageously to, a supporting frame and sized for the striking or kicking of the key pads by a user while standing. The keyboard is adapted for communication with a computer.

The supporting frame may include at least one substantially horizontal support mounted on at least one substantially vertical upright wherein the array of keypads is mounted to the horizontal supports. The supporting frame and array may be substantially planar or alternatively the array may lie substantially along an arcuate surface. The arcuate surface may include a concave surface so as to wrap at least partially around the front of a user facing the keyboard. The array may be substantially entirely in the concave surface.

The supporting frame may also be arcuate so as to correspond in an arcuate shape corresponding to the arcuate surface. In particular, the horizontal support may include horizontal supports which are substantially entirely concave so as to correspond to the concave surface or which substantially correspond in shape so as to follow the arcuate surface.

The keyboard has a height dimension which is substantially head-high relative to the user. The array of keypads includes horizontal rows of the keypads and in one embodiment the horizontal rows are vertically selectively adjustable on the vertical uprights so that an uppermost row of the horizontal rows is adjustable up to a height dimension corresponding to the head height of a particular user. The horizontal rows may each be independently vertically selectively adjustable.

In one embodiment the keypads are resiliently mounted by resilient means to the horizontal supports. A computer monitor may be mounted above the array so as to be visible by the user when standing in front of the array of keypads and within striking distance thereof. A cursor controller may be wirelessly mountable or mounted to the user for wireless controlling of a cursor on the monitor.

BRIEF DESCRIPTION OF THE DRAWINGS

In the following drawings which are attached hereto and form part of this specification, similar characters of reference denote corresponding parts in each view.

DETAILED DESCRIPTION OF EMBODIMENTS OF THE INVENTION

Figure 1:
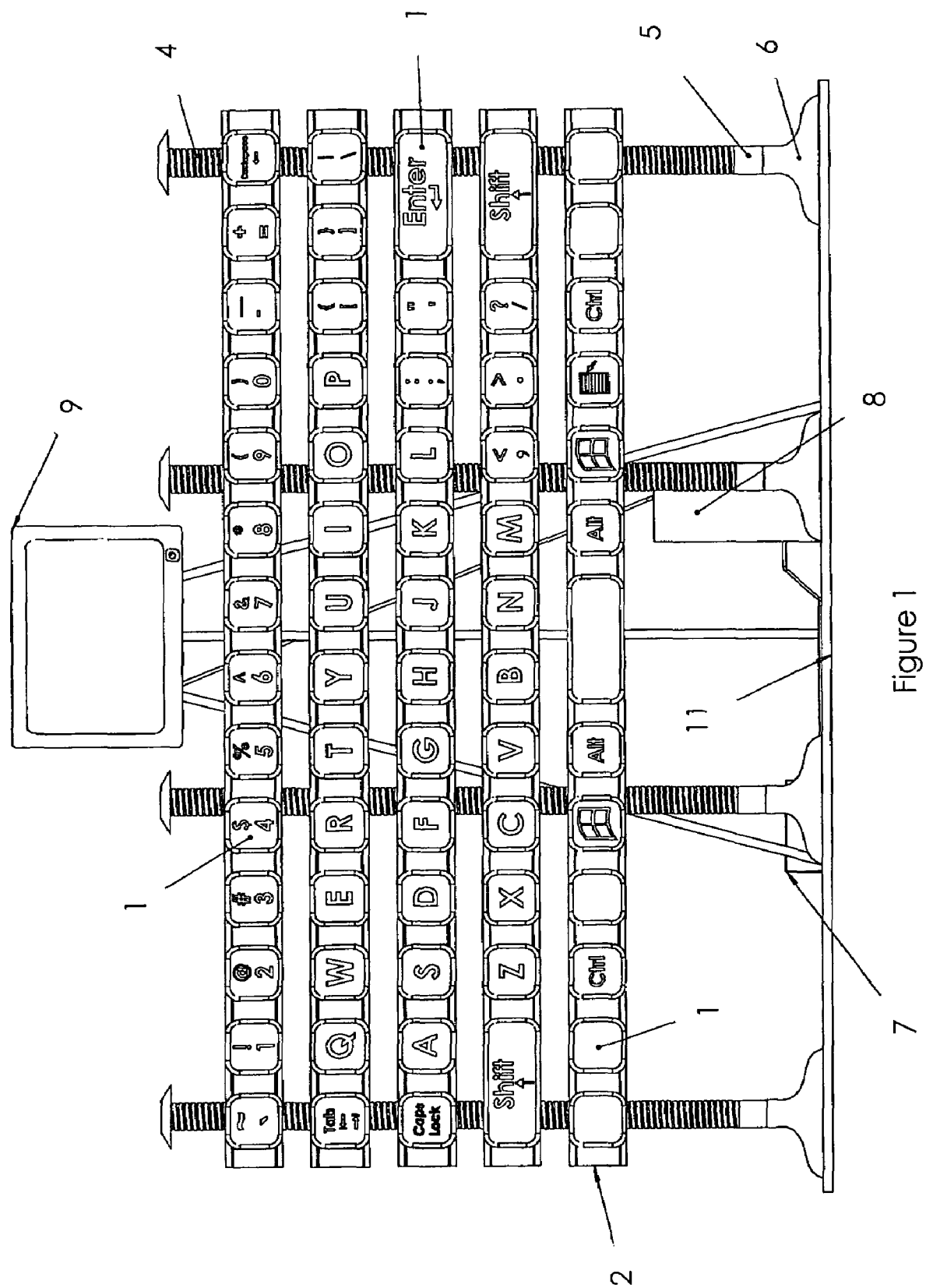
FIG. 1 is, in front perspective view, a preferred embodiment of the exercise computer keyboard configured in a plane.
Figure 3:
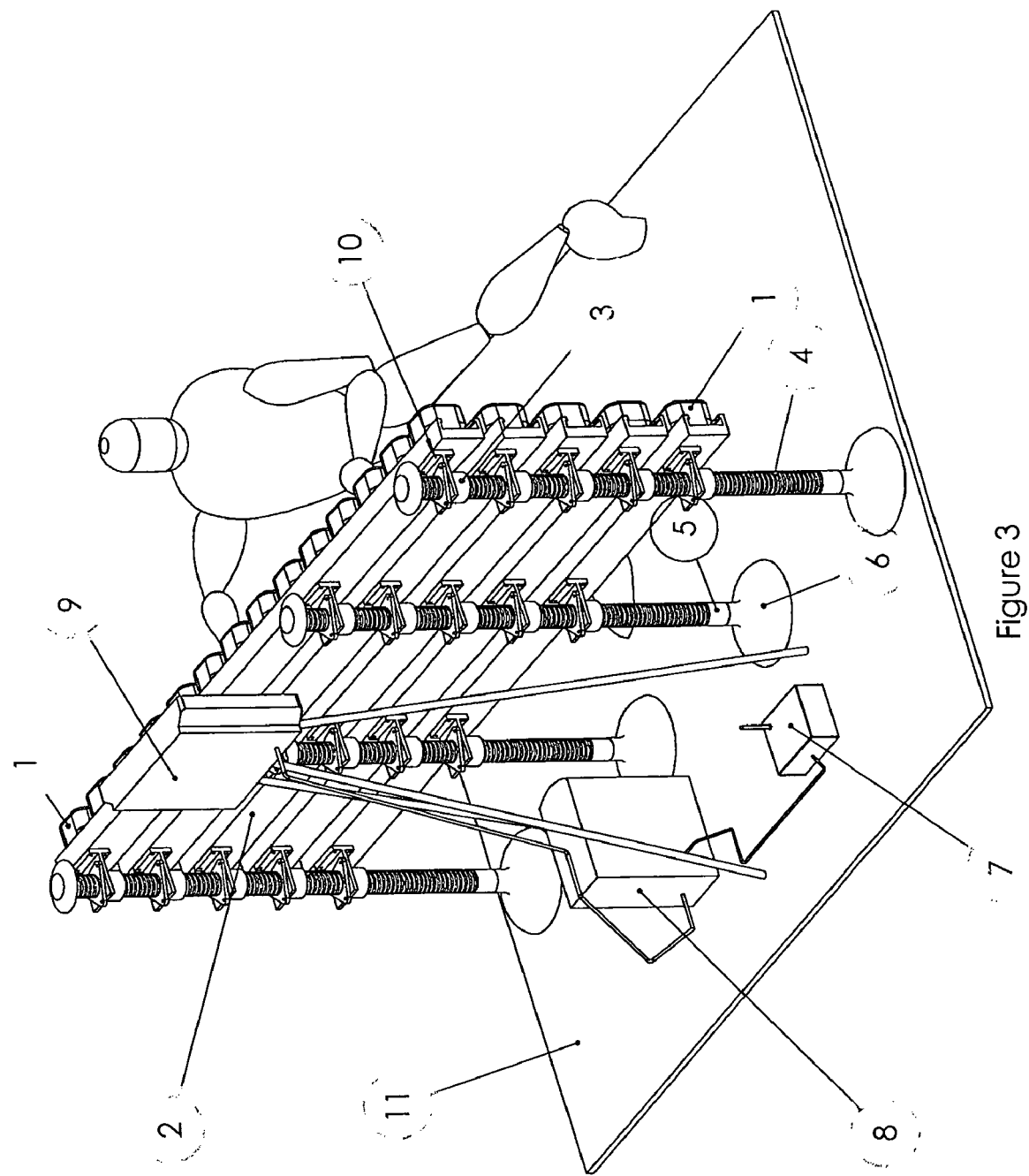
FIG. 3 is, in rear isometric perspective view, a preferred embodiment of the exercise computer keyboard configured in a plane, with a user punching the striking pads.
Figure 4:
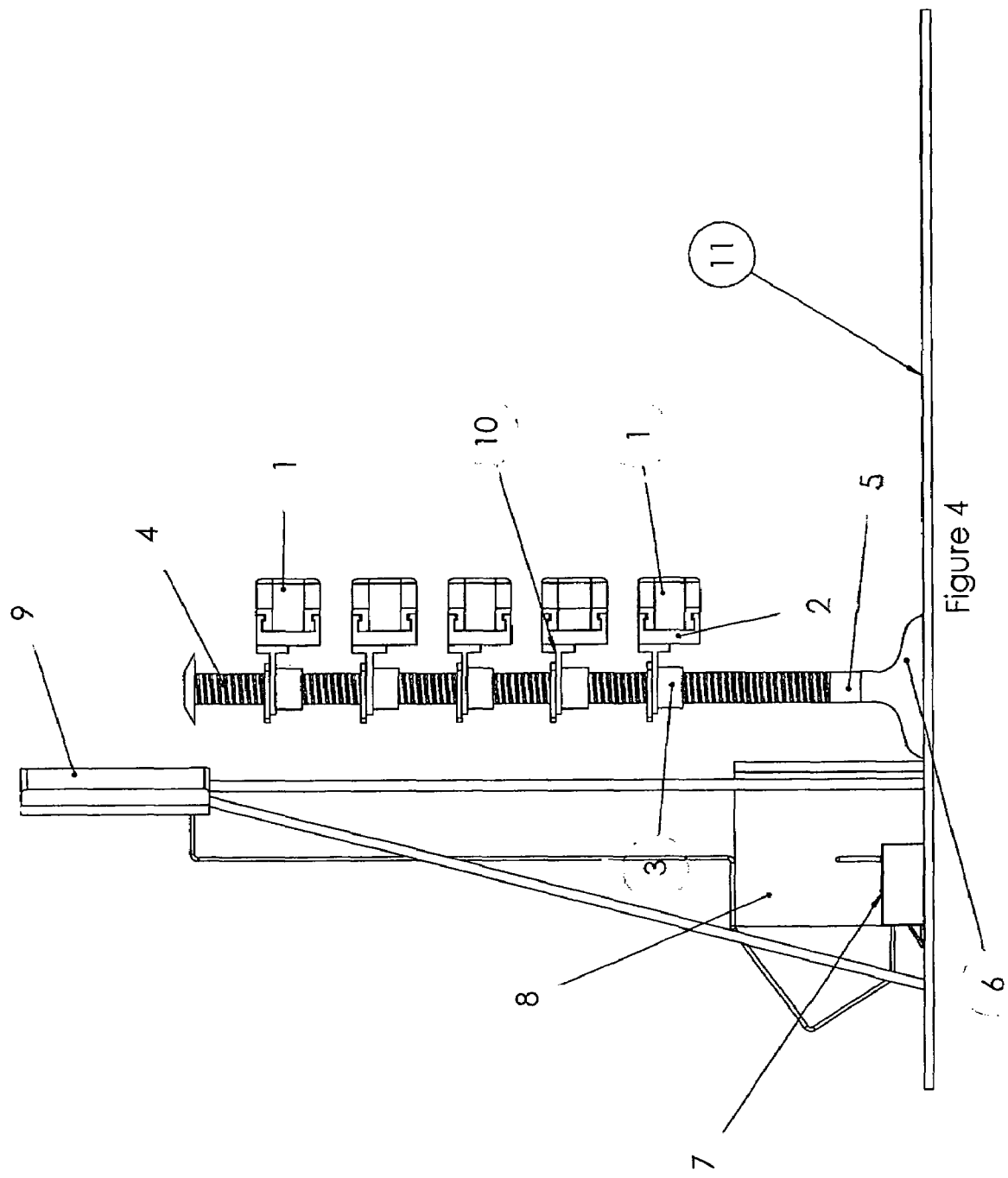
FIG. 4 is, in side perspective view, a preferred embodiment of the exercise computer keyboard configured in a plane.
Figure 5:
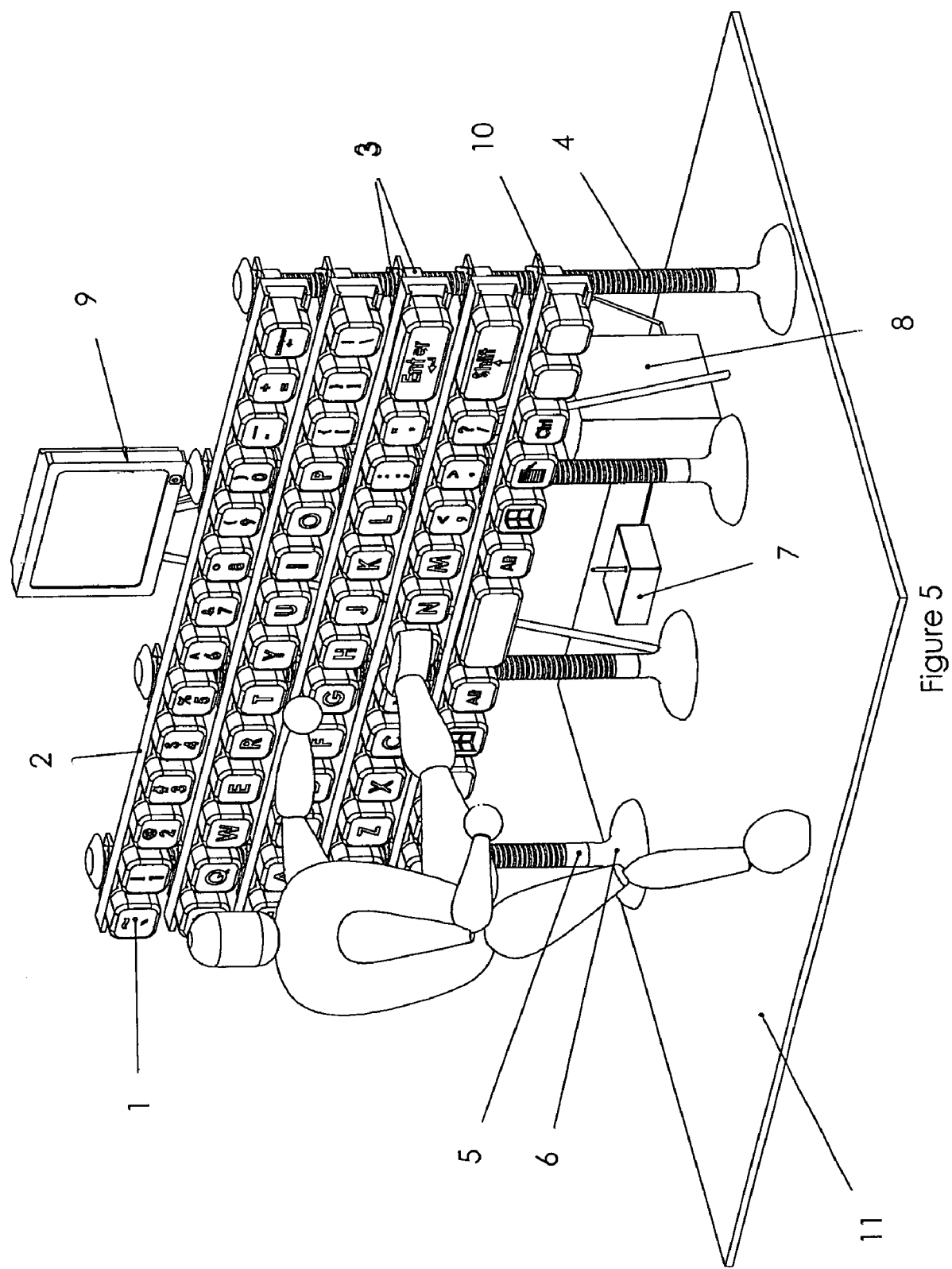
FIG. 5 is, in front perspective view, a preferred embodiment of the exercise computer keyboard configured in a plane, with a user kicking the striking pads.
Figure 6:
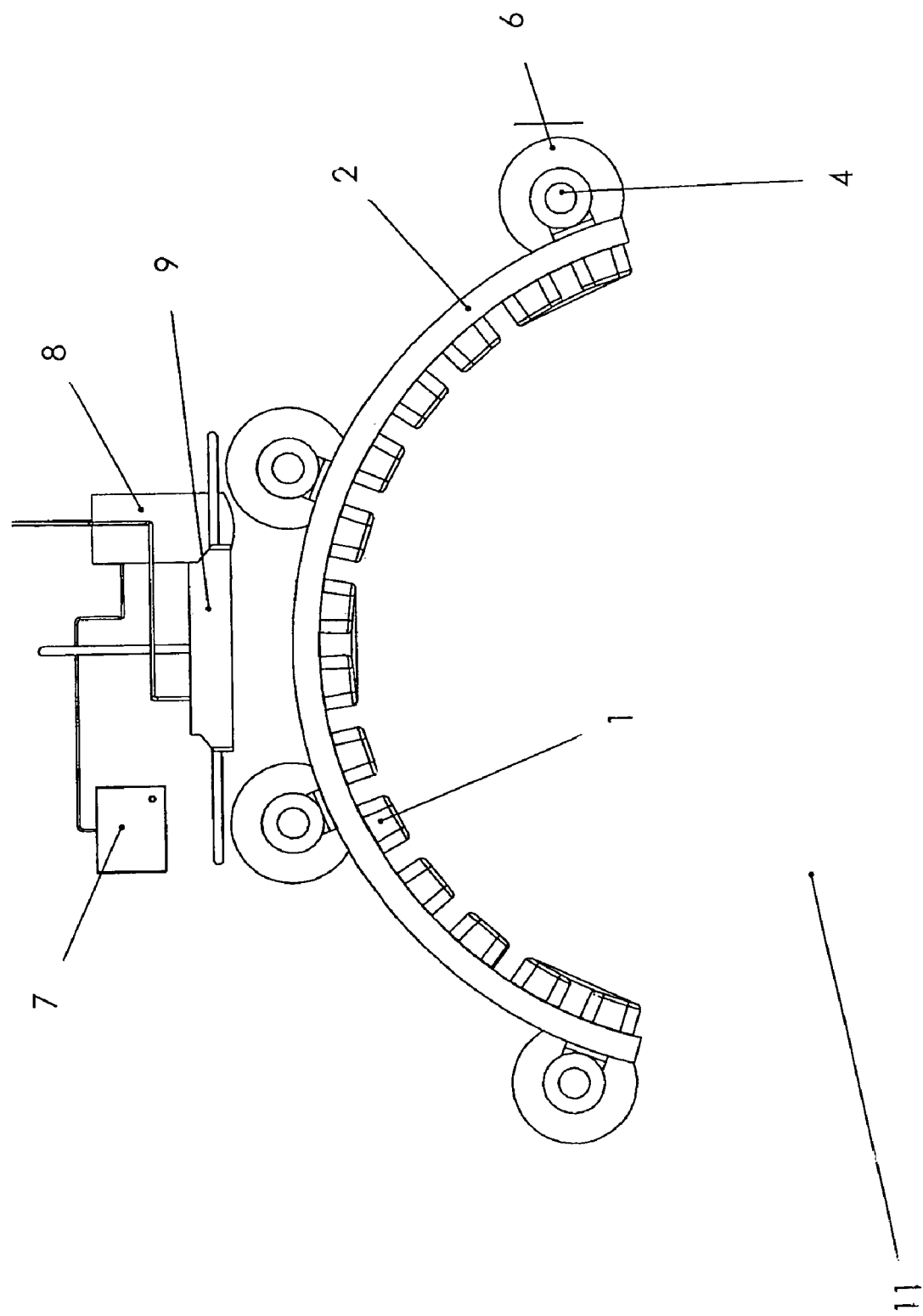
FIG. 6 is, in plan view, a preferred embodiment of the exercise computer keyboard configured in an arch formation.
Figure 7:
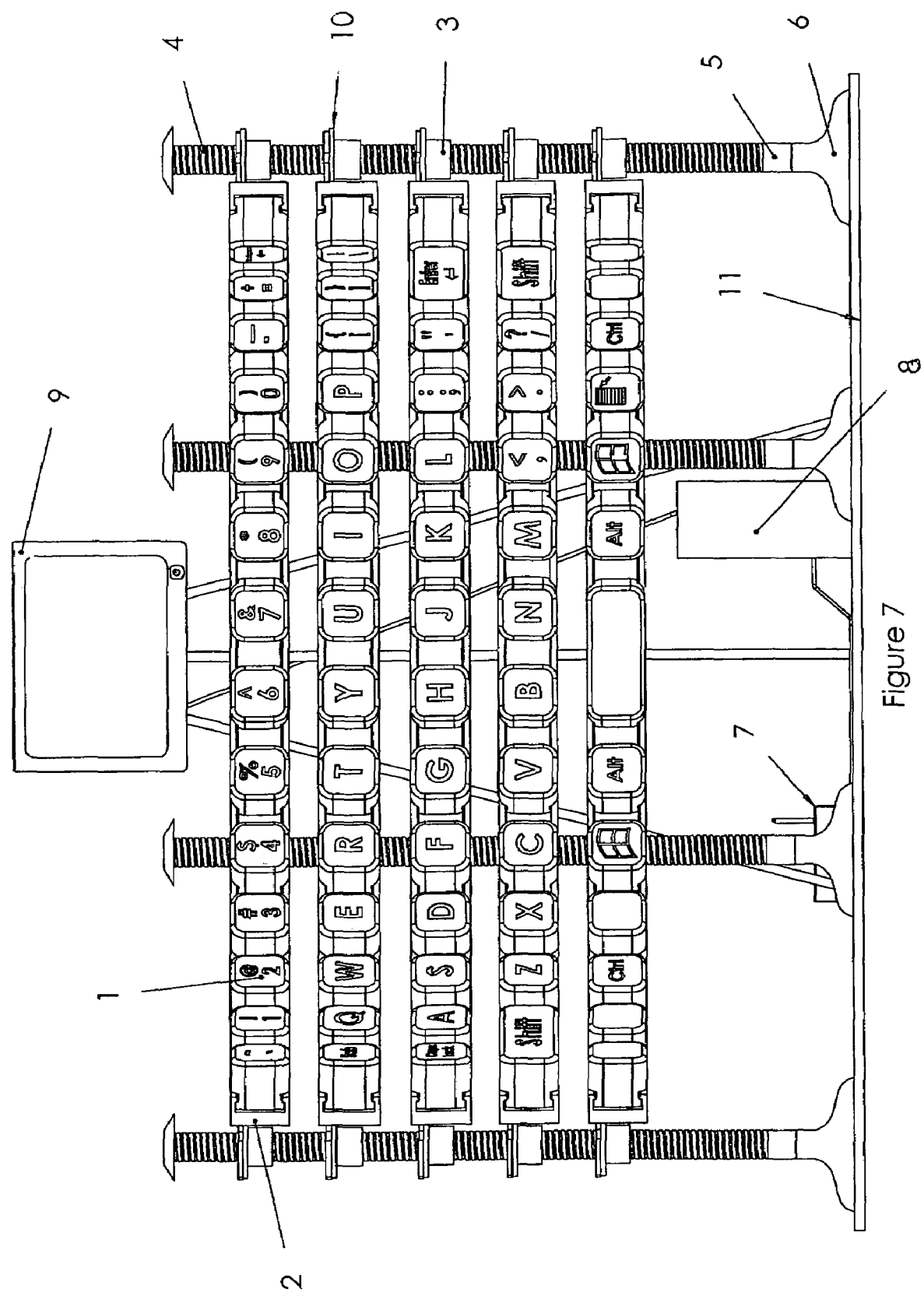
FIG. 7 is, in front view, a preferred embodiment of the exercise computer keyboard configured in an arch formation.
Figure 8:
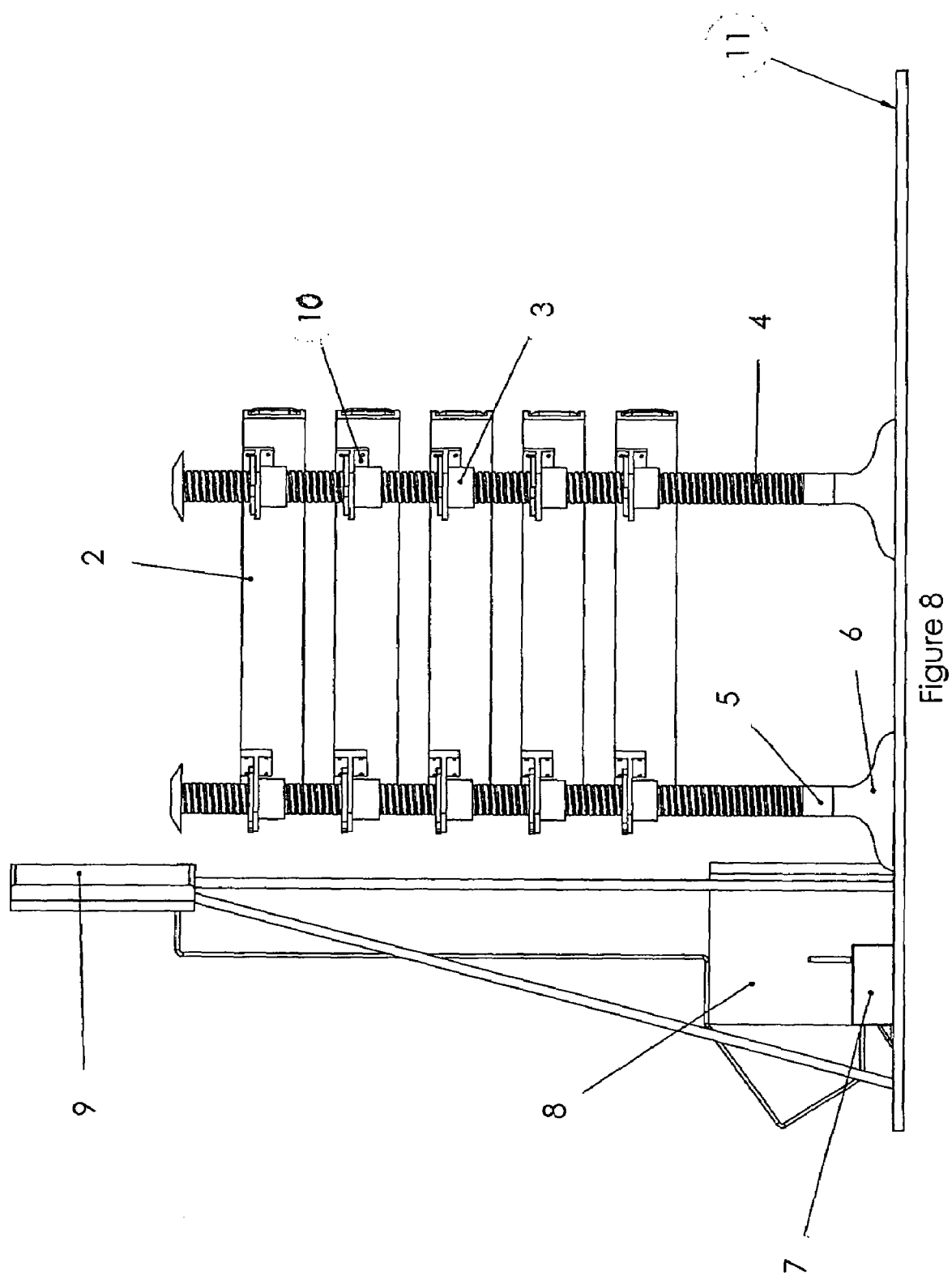
FIG. 8 is, in side view, a preferred embodiment of the exercise computer keyboard configured in an arch formation.
Figure 9:
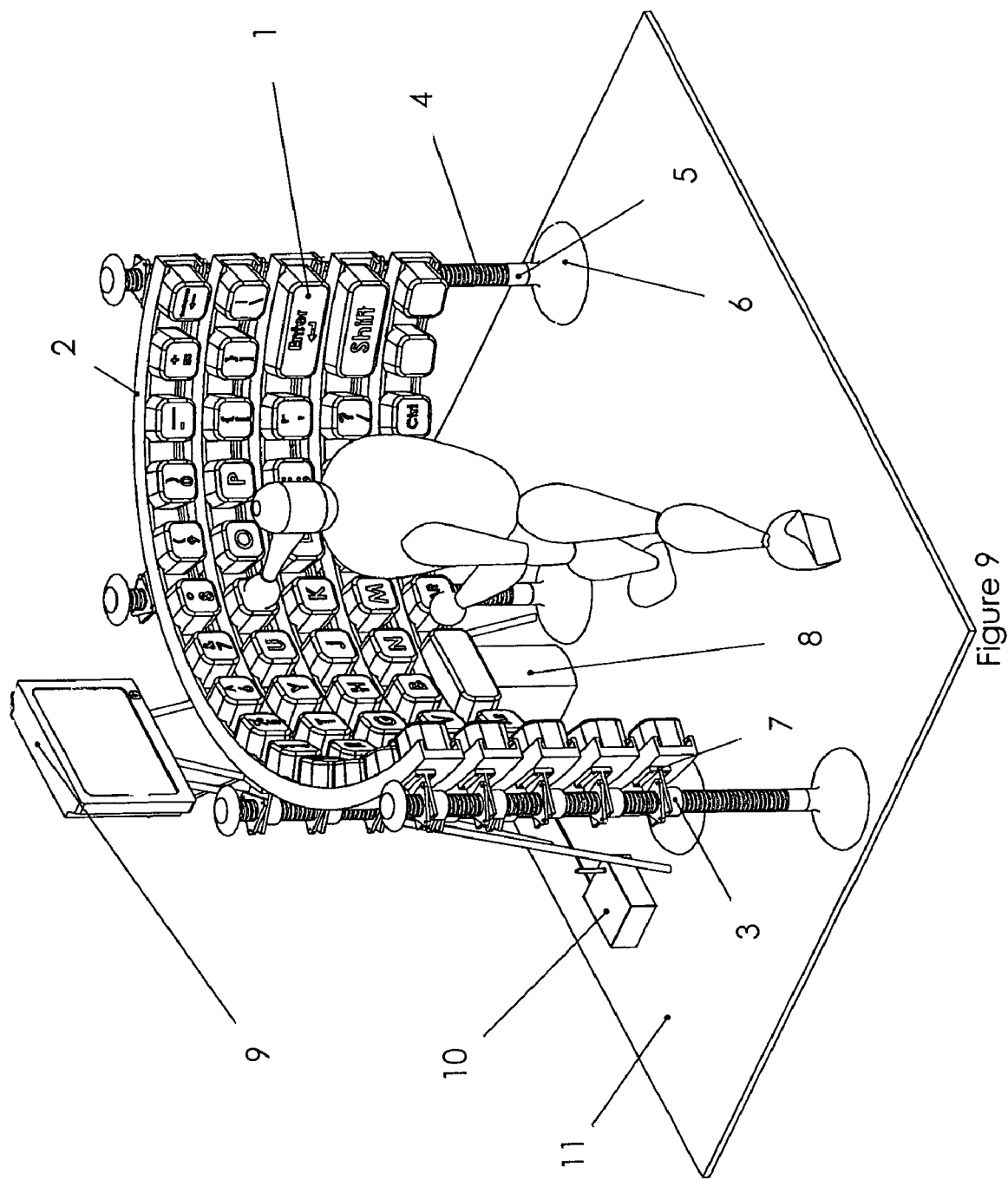
FIG. 9 is, in front perspective view, a preferred embodiment of the exercise computer keyboard configured in an arch formation, with a user punching the striking pads.
Figure 10:
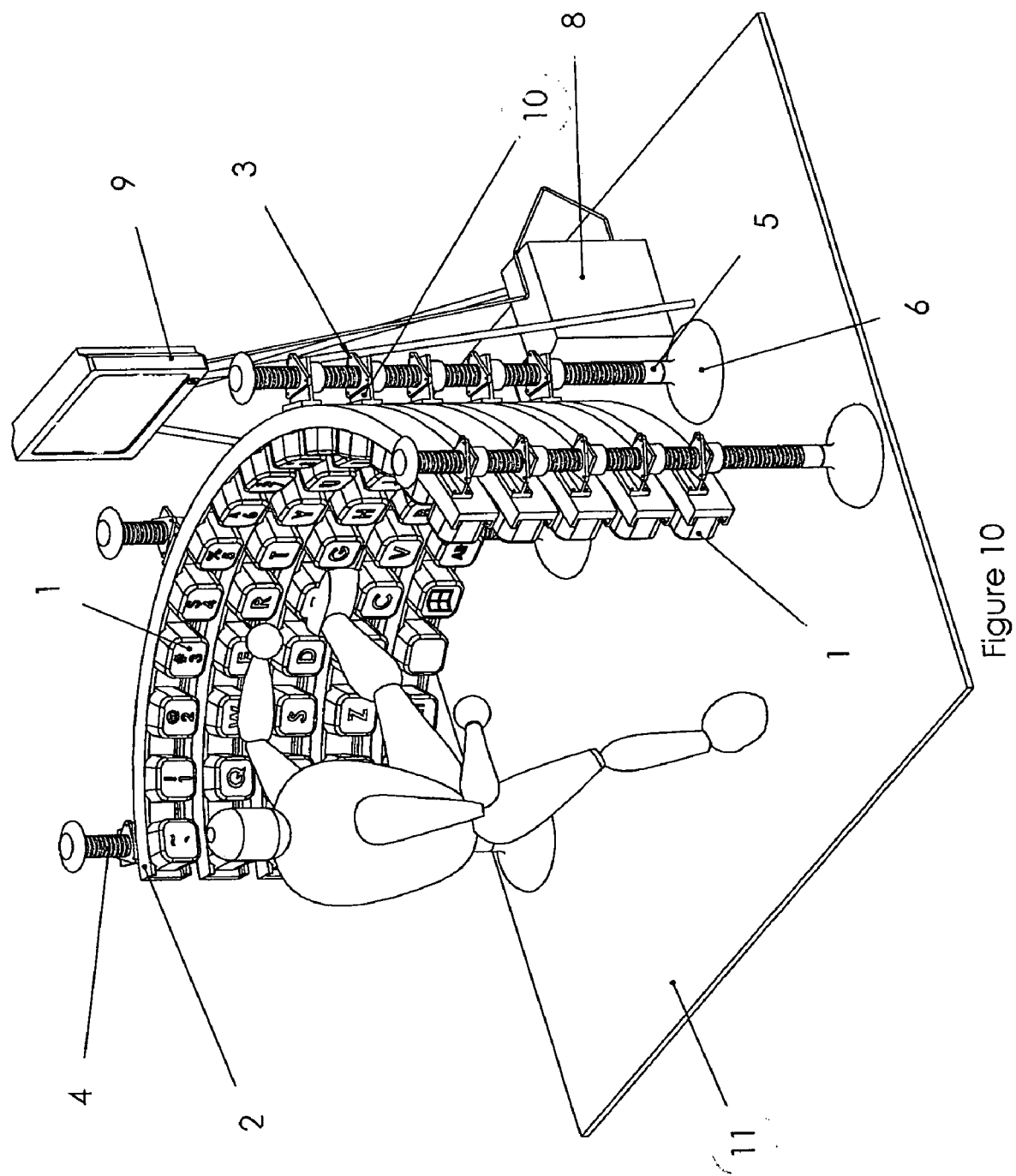
FIG. 10 is, in front perspective view, a preferred embodiment of the exercise computer keyboard configured in an arch formation, with a user kicking the striking pads.

The present invention is a computer input device in the form of an oversize keyboard mounted on a stand as shown in FIG. 1, such that the keys are pads 1 which may be struck by body parts such as hands or feet of a user. The preferred embodiment of each pad 1 of the keyboard is a pad similar to those used in martial arts practice such as striking or punching pad labeled to represent a key of a keyboard. Integrated into each labeled pad is an electronic switch (not shown) that activates when sufficient impact force is applied to the pad. The activation of the pad switch is conveyed to a computer 8 via a keyboard interface 7. An array of pads 1 are labeled according the keys of a computer keyboard, such as but not limited to QWERTY, DVORAK, and other keyboard layouts, and are connected to an interface 7 so as to form a computer keyboard activated primarily by punching (as shown in FIGS. 3 and 9), and kicking (as shown in FIGS. 5 and 10) the keyboard pads 1. Use of the keyboard by such punching and kicking results in expenditure of significant body energy on the part of the user thus provides a form of exercise while using the computer for any one of an assortment of computer based applications requiring user input via a keyboard such as word processing, emailing, etc.

Each pad switch in the keyboard of the present invention may be hardwired to the interface, which multiplexes and encodes pad strikes into the appropriate ASCII codes for keyboard input, much the same as conventional keyboard technology. This can be further extended by integrating a wireless device into each keypad such as an RFID tag, which transmits its ID each time the pad is struck with sufficient intensity. In the wireless keypad scenario the keyboard interface 7 would include an RFID reader, which associates each RFID serial number with a labeled striking pad 1 key and converts this information to the appropriate ASCII keyboard code which is conveyed to the interfacing computer 8 via a standard keyboard interface.

Typically wireless devices use batteries as power sources needing to be replaced periodically, which will be a significant task on a 50-100 key keyboard. A wireless embodiment of the present invention will potentially include a power source capable of harnessing strike energy and converting it to electrical energy to supply the needs of the RFID transmitter within the striking keypad 1. Energy harvesting may include techniques such as a spring loaded sliding magnet within a coil with the current generated rectified and stored for subsequent use. The storage medium may include rechargeable batteries, low leakage capacitors, or other.

Figure 2:
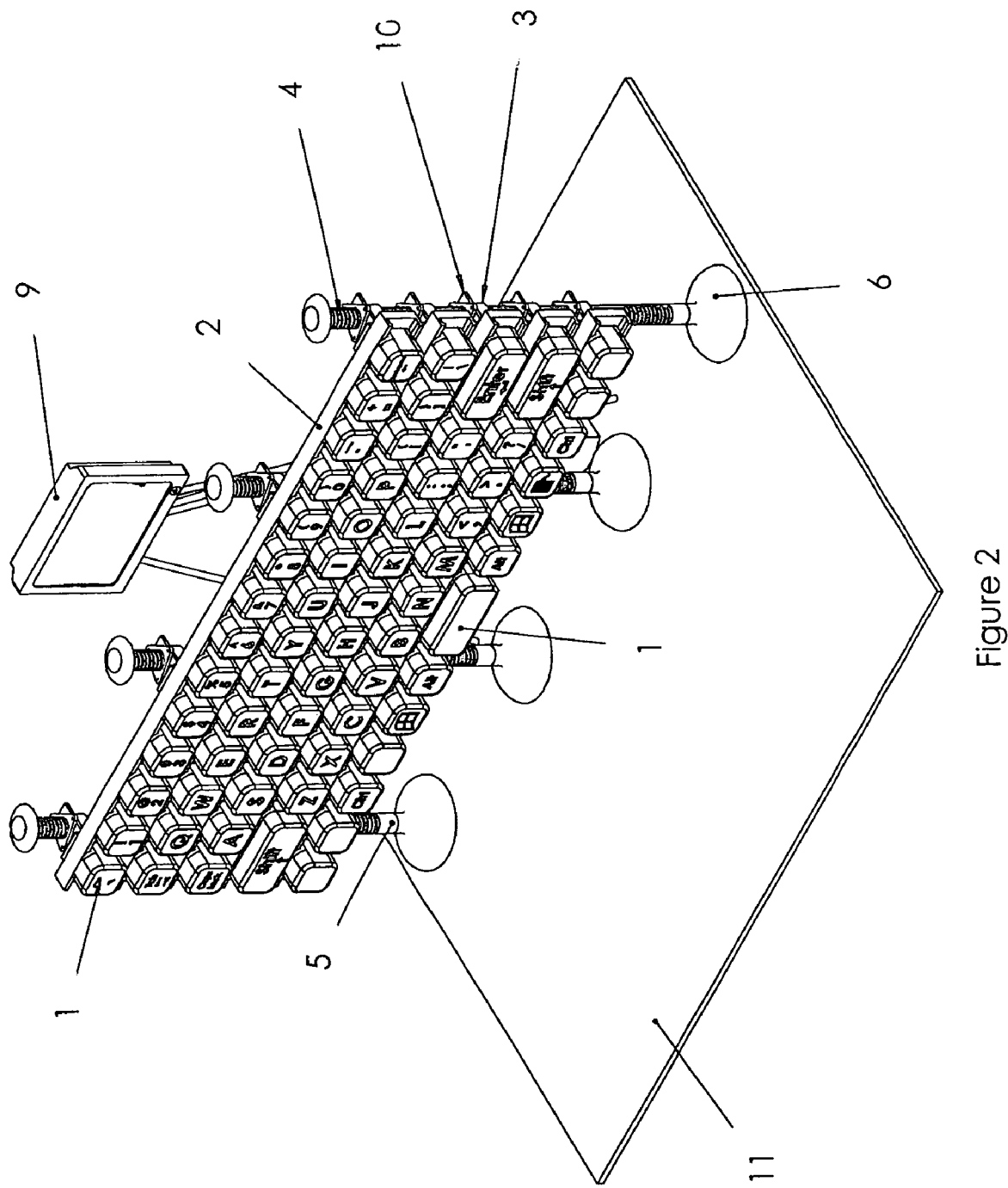
FIG. 2 is, in front isometric perspective view, a preferred embodiment of the exercise computer keyboard configured in a plane.

FIG. 2 shows each labeled striking pad 1, supported by a bar 2 with multiple bars 2 forming rows of the keyboard that are substantially parallel to the floor. Each support bar 2 is attached to an upright stanchion 4 by a fastener, bracket clamp, or stanchion race 3. In applications where the keyboard row height may be fixed, a fastener, clamp, or bracket may be used to fix the support bar 2 to the upright support stanchions 4. The stanchion 4 may be an extruded profile of almost any shape, tubular or solid member. Stanchion 4 may be of a variety of rigid materials including plastics, metals, or composites. Multiple stanchions 4 in a spaced array support bars 2 and are in turn supported by corresponding stanchion bases 6.

In applications where it is desirable to adjust the elevation of the keyboard rows, one method may include stanchions 4 being threaded as in a ball screw arrangement, with each stanchion 4 being supported by a motorized mount 5 on base 6 capable of rotationally driving the stanchion 4 ball screw, which in turn causes the support bars 2 to move up or down by way of the stanchion races 3. Each stanchion motorized mount 5 may advantageously be synchronized with the other stanchion motorized mounts 5 to ensure that the support bars 2 move up and down in unison, substantially parallel to the floor 11, without binding. A combination of motorized and non-motorized stanchions may be used to reduce cost and complexity of the keyboard, with the non-motorized stanchions 4, typically being shafts with linear bearings or the like of any suitable cross-sectional profile, but typically circular in cross section.

The exercise computer keyboard of the present invention may be configured in a planar (see FIGS. 1 through 5), convex, or concave (see FIGS. 6 through 10) layout depending on the user's exercise needs and preference by providing correspondingly linear or arcuate support bars 2.

Figure 11:
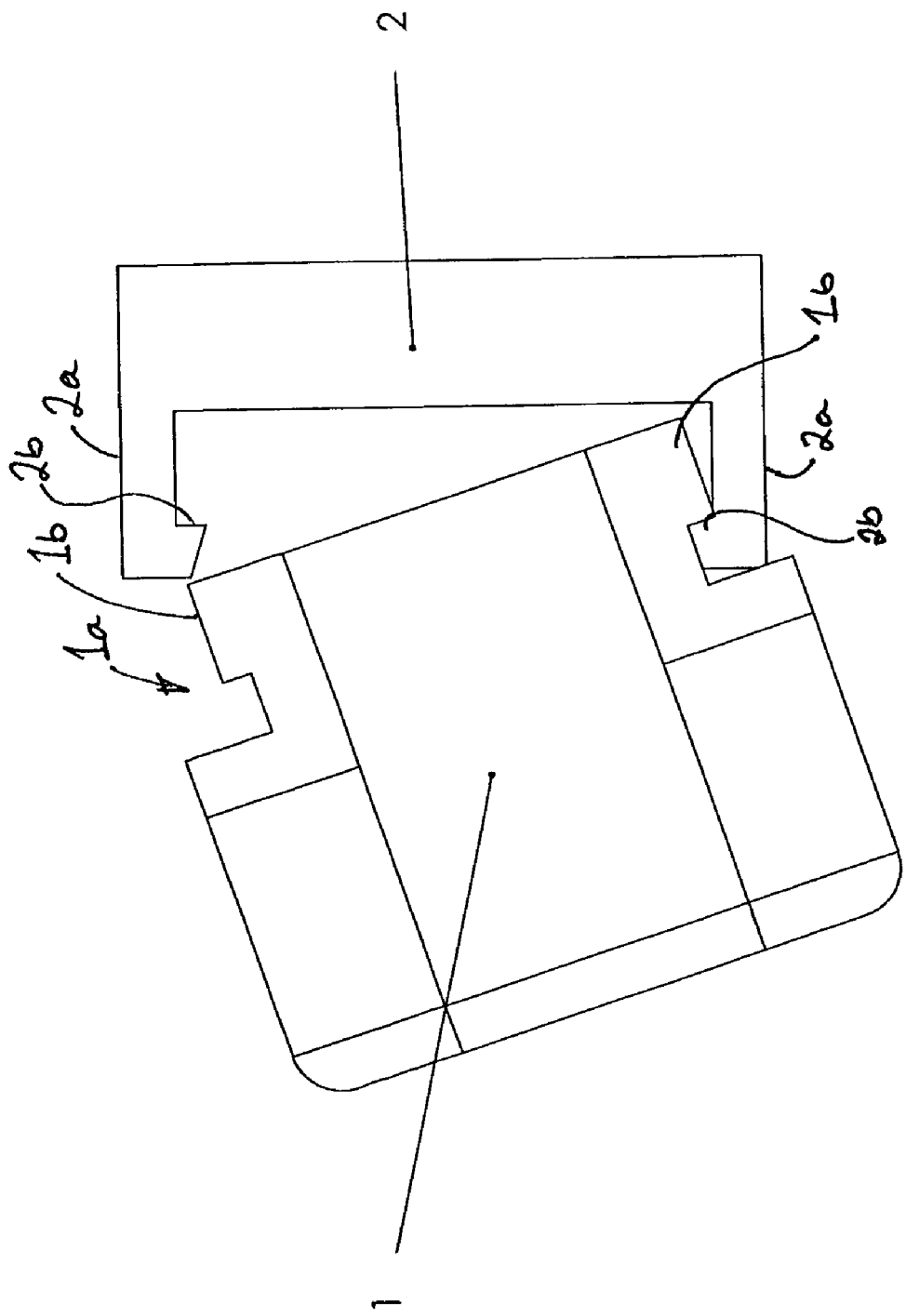
FIG. 11 is, in side view, a striking pad being snapped into the supporting bar and channel.

Each striking keypad 1 may have a rigid backing that may be snapped into the corresponding support bar 2 as shown in FIG. 11. Support bar 2 may be made of an extruded rectangular C-section, the flanges 2a of which are adapted to mate with the rigid backing 1a of the striking pad 1 by for example a snap-in fit so as to mount pad base flanges 1b behind lips 2b of flanges 2a. Alternatively the keypad may be attached to support bars 2 by hook and loop fasteners, or threaded fasteners such as screws or bolts.

Any exposed space on the support bars 2 between striking pads 1 may be padded to reduce the likelihood of injury when the user strikes and misses a striking key pad 1. The preferred embodiment of the present invention may include a non slip floor or mat 11 upon which the exercise keyboard is installed to enhance footing stability, particularly when the user is striking pads with their feet. Padded hand and foot wear may be used to protect the user and preserve the striking pads from excessive wear and tear.

The exercise keyboard interface 7 may connect with the computer 8 by a conventional keyboard connection, USB, or Infrared interface.

Another embodiment of the wireless version exercise keyboard may use encoded infrared transmitters in place of RFID tags, transmitting to the keyboard interface or directly to the infrared communications port on a computer.

In alternative embodiments accelerometers, level sensing switches similar to those used in home heating thermostats, tamper detection switches, audio, and optical input devices may be employed to sense strikes to a keypad 1. In addition to different sensing technologies, pad strike sensing may be integrated into support bars 2 instead of into the striking key pads 1 themselves. Further combinations of sensing technologies as in sensor fusion may be used to detect key pad strikes such as video imaging of the key pads used in combination with audio or accelerometer inputs to verify that a key pad 1 has been physically struck.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. An exercise keyboard comprising:
   a substantially vertical keyboard array of keypads arranged for typing alphanumeric letters by pushing of keypads of said array so as to type one said letter per said push of one of said keypads,
   wherein each said keypad is padded so as to accommodate said pushing of said keypads by striking or kicking of said keypads by a user,
   wherein said array is mounted in a supporting frame and sized for said striking by a user and wherein said keyboard is adapted for communication with a computer,
   wherein said supporting frame includes at least one substantially horizontal support mounted on at least one substantially vertical upright,
   and wherein said array of keypads is mounted on said substantially horizontal support and is selectively adjustable horizontally so as to adjust positions of said each keypad relative to one another,
   and wherein said array of keypads is selectively adjustable vertically on said at least one substantially vertical upright so as to adjust positions of rows of keypads in said array of keypads relative to one another.

2. The keyboard of claim 1 wherein said supporting frame is substantially planar and said array is substantially planar.

3. The keyboard of claim 2 wherein said array is mounted to said horizontal supports.

4. The keyboard of claim 3 wherein said rows of keypads in said array includes horizontal rows of said keypads.

5. The keyboard of claim 4 wherein said horizontal rows are each independently vertically selectively adjustable.

6. The keyboard of claim 5 wherein said array replicates a QWERTY typing keyboard arrangement of keys.

7. The keyboard of claim 6 wherein said keypads of said array are resiliently mounted by resilient means to said horizontal supports.

8. The keyboard of claim 1 wherein said array lies substantially along an arcuate surface.

9. The keyboard of claim 8 wherein said arcuate surface includes a concave surface so as to wrap at least partially around the front of a user facing said keyboard, with said array of keypads facing the user.

10. The keyboard of claim 9 wherein said array lies in substantially entirely said concave surface.

11. The keyboard of claim 8 wherein said supporting frame is also arcuate so as to correspond in an arcuate shape corresponding to said arcuate surface.

12. The keyboard of claim 9 wherein said supporting frame is also arcuate so as to correspond in an arcuate shape corresponding to said arcuate surface.

13. The keyboard of claim 10 wherein said at least one horizontal support includes horizontal supports which are substantially entirely concave so as to correspond to said concave surface.

14. The keyboard of claim 11 wherein said at least one horizontal support includes horizontal supports which substantially correspond in shape so as to follow said arcuate surface.

15. The keyboard of claim 14 wherein said array is mounted to said horizontal supports.

16. The keyboard of claim 15 wherein said row of keypads in said array are horizontal rows of said keypads.

17. The keyboard of claim 16 wherein said horizontal rows are each independently vertically selectively adjustable.

18. The keyboard of claim 17 wherein said array replicates a QWERTY typing keyboard arrangement of keys.

19. The keyboard of claim 15 wherein said keypads of said array are resiliently mounted by resilient means to said horizontal supports.

* * * * *